United States Patent
Huang et al.

(10) Patent No.: US 11,966,530 B1
(45) Date of Patent: Apr. 23, 2024

(54) TOUCHPAD MODULE AND COMPUTING DEVICE USING SAME

(71) Applicant: Primax Electronics Ltd., Taipei (TW)

(72) Inventors: Wei-Chiang Huang, Taipei (TW); Chao-Wei Lee, Taipei (TW); Hsueh-Chao Chang, Taipei (TW); Sian-Yi Chiu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/138,438

(22) Filed: Apr. 24, 2023

(30) Foreign Application Priority Data

Mar. 31, 2023 (TW) .................................. 112112713

(51) Int. Cl.
*G06F 3/041* (2006.01)
*G06F 3/044* (2006.01)

(52) U.S. Cl.
CPC .......... *G06F 3/0414* (2013.01); *G06F 3/0447* (2019.05); *G06F 2203/04105* (2013.01)

(58) Field of Classification Search
CPC ....... G06F 2203/04105; G06F 3/03547; G06F 3/041
See application file for complete search history.

(56) References Cited

U.S. PATENT DOCUMENTS

| | | | | |
|---|---|---|---|---|
| 10,908,692 | B2 * | 2/2021 | Mori | H02K 33/18 |
| 11,768,548 | B2 * | 9/2023 | Choi | G01L 1/205 |
| | | | | 345/157 |
| 2019/0079459 | A1 * | 3/2019 | Sun | G04B 47/06 |
| 2020/0201465 | A1 * | 6/2020 | Lee | G06F 3/0414 |
| 2022/0291796 | A1 * | 9/2022 | Lu | G06F 1/169 |

* cited by examiner

*Primary Examiner* — Koosha Sharifi-Tafreshi
(74) *Attorney, Agent, or Firm* — KIRTON McCONKIE; Evan R. Witt

(57) ABSTRACT

A touchpad module includes a base plate, a touch member and at least one pressure sensing module. The touch member is located over the base plate. The touch member includes a touch plate and a touch sensitive circuit board. The pressure sensing module is arranged between the base plate and the touch member. The pressure sensing module includes a pressure sensor and a miniature supporting plate. The pressure sensor is installed on the miniature supporting plate. The pressure sensor is electrically connected with the touch sensitive circuit board through the miniature supporting plate. While the touch member is pressed in response to an external pressing force, the pressing force exerted on the touch member is sensed by the at least one pressure sensing module, and the pressure sensing module generates a pressure sensing signal.

5 Claims, 4 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device. For example, in case that the user's finger is placed on the touchpad and slid on the touchpad, a cursor shown on a display screen is correspondingly moved. Moreover, in case that the touchpad is pressed down by the user's finger, the electronic device executes a specified function. The use of the touchpad can implement some functions of the conventional mouse. In other words, the user may operate the electronic device through the touchpad without the need of additionally carrying or installing the mouse.

Nowadays, more and more touchpads are equipped with pressure sensors. When the user's finger presses the touchpad, a pressing force of the user applied to the touchpad is sensed by the pressure sensor. Consequently, a pressure sensing signal is outputted from the pressure sensor. After the pressure sensing signal is transmitted from the pressure sensor to a main board of the touchpad through a flexible printed circuit (FPC), the pressure sensing signal is transmitted from the main board to the electronic device. According to the pressure sensing signal, the touchpad controls the electronic device to execute the corresponding function.

However, the process of manufacturing the conventional touchpad still has some drawbacks. For example, the step of assembling the pressure sensor on the flexible printed circuit (FPC) has to be implemented by the manufacturer. After the pressure sensor is assembled on the flexible printed circuit, the combination of the pressure sensor and the flexible printed circuit is transported from the manufacturer to the associated factory in order to be further assembled as the touchpad. During the transportation process, the pressure sensor is usually suffered from collision, and the possibility of causing damage of the pressure sensor is increased. Consequently, the yield of the assembled touchpad is declined. Moreover, since the manufacturing procedures of the touchpad are unable to be completed in the same factory, the overall fabricating process is complicated, and the fabricating cost is greatly increased.

Therefore, there is a need of providing an improved touchpad module in order to overcome the above drawbacks.

SUMMARY OF THE INVENTION

An object of the present invention provides a touchpad module. The structural design of the touchpad module is simple. In addition, the touchpad module can be assembled easily. Consequently, the overall fabricating process is simplified, and the fabricating cost is largely decreased.

The other objects and advantages of the present invention will be understood from the disclosed technical features.

In accordance with an aspect of the present invention, a touchpad module for a computing device is provided. The touchpad module is installed within a fixing frame of the computing device. The touchpad module includes a base plate, a touch member and at least one pressure sensing module. The touch member is located over the base plate. The touch member includes a touch plate and a touch sensitive circuit board. The at least one pressure sensing module is arranged between the base plate and the touch member. Each of the at least one pressure sensing module includes a pressure sensor and a miniature supporting plate. The pressure sensor is installed on the miniature supporting plate. The pressure sensor is electrically connected with the touch sensitive circuit board through the miniature supporting plate. While the touch member is pressed in response to an external pressing force, the pressing force exerted on the touch member is sensed by the at least one pressure sensing module, and the at least one pressure sensing module generates a pressure sensing signal.

In an embodiment, the at least one pressure sensing module is installed on the touch sensitive circuit board of the touch member, and the miniature supporting plate is arranged between the touch sensitive circuit board and the corresponding pressure sensor. While the touch member is pressed in response to the pressing force, the touch member is subjected to deformation, and the touch member has a deformation amount. When the pressing force exerted on the touch member is sensed by the pressure sensing module according to the deformation amount, the at least one pressure sensor generates the pressure sensing signal.

In an embodiment, each of the at least one pressure sensing module is installed on the base plate, and the miniature supporting plate is arranged between the corresponding pressure sensor and the base plate. While the touch member is pressed in response to the pressing force, the base plate is driven by the touch member, so that the base plate is subjected to deformation and the base plate has a deformation amount. When the pressing force exerted on the touch member is sensed by the pressure sensing module according to the deformation amount, the at least one pressure sensor generates the pressure sensing signal.

In an embodiment, the touchpad module further includes at least one cantilever structure. The at least one cantilever structure is arranged between the touch member and the base plate. The at least one pressure sensing module is installed on the at least one cantilever structure. While the touch member is pressed in response to the pressing force, the at least one cantilever structure is compressed by the touch member, so that the at least one cantilever structure is subjected to deformation and the at least one cantilever structure has a deformation amount. When the pressing force exerted on the touch member is sensed by the pressure sensing module according to the deformation amount, the at least one pressure sensor generates the pressure sensing signal.

In an embodiment, each of the at least one cantilever structure includes a first connection part, a second connection part and an elastic body. The elastic body is connected between the first connection part and the second connection part. The first connection part is connected with the touch member. The second connection part is connected with the base plate. The at least one pressure sensing module is installed on the elastic body.

In an embodiment, the at least one cantilever structure includes plural cantilever structures, and the plural cantilever structures include a first cantilever structure and a second cantilever structure. The elastic body of the first cantilever structure includes a first surface and a second surface. The elastic body of the second cantilever structure includes a third surface and a fourth surface. The first surface and the second surface are opposed to each other. The third surface and the fourth surface are opposed to each other. The second surface and the fourth surface face each other.

In an embodiment, the at least one pressure sensing module includes plural pressure sensing modules, and the plural pressure sensing modules include a first pressure sensing module and a second pressure sensing module. The first pressure sensing module is installed on the first surface of the elastic body of the first cantilever structure. The second pressure sensing module is installed on the third surface of the elastic body of the second cantilever structure.

In an embodiment, the at least one pressure sensing module includes plural pressure sensing modules, and the plural pressure sensing modules include a first pressure sensing module and a second pressure sensing module. The first pressure sensing module is installed on the second surface of the elastic body of the first cantilever structure. The second pressure sensing module is installed on the fourth surface of the elastic body of the second cantilever structure.

In an embodiment, the touchpad module further includes an electrical connector. The miniature supporting plate of the at least one pressure sensing module is electrically connected with the touch sensitive circuit board of the touch member through the electrical connector.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a base plate, a touch member and at least one pressure sensing module. The touch member is located over the base plate. The touch member includes a touch plate and a touch sensitive circuit board. The at least one pressure sensing module is arranged between the base plate and the touch member. Each of the at least one pressure sensing module includes a pressure sensor and a miniature supporting plate. The pressure sensor is installed on the miniature supporting plate. The pressure sensor is electrically connected with the touch sensitive circuit board through the miniature supporting plate. While the touch member is pressed in response to an external pressing force, the pressing force exerted on the touch member is sensed by the at least one pressure sensing module, and the at least one pressure sensing module generates a pressure sensing signal.

From the above descriptions, the present invention provides the touchpad module. In the touchpad module, the pressure sensor is directly installed on the miniature supporting plate, and the pressure sensor and the miniature supporting plate are collaboratively formed as the pressure sensing module. Since it is not necessary to install the pressure sensor on the flexible printed circuit, the assembling process of the present invention is easier than the conventional technology. Consequently, the structural design of the touchpad module of the present invention is simplified. Furthermore, the pressure sensing module of the present invention can be applied to the processes of manufacturing the touchpad modules with various sizes. As long as the pressure sensing module is installed on the corresponding position (e.g., the touch sensitive circuit board of the touch member, the base plate or the cantilever structure), the pressure sensing module can be applied to any appropriate touchpad module. The structural design of the touchpad module is simple. In addition, the touchpad module can be assembled easily. Consequently, the overall fabricating process is simplified, and the fabricating cost is largely decreased.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
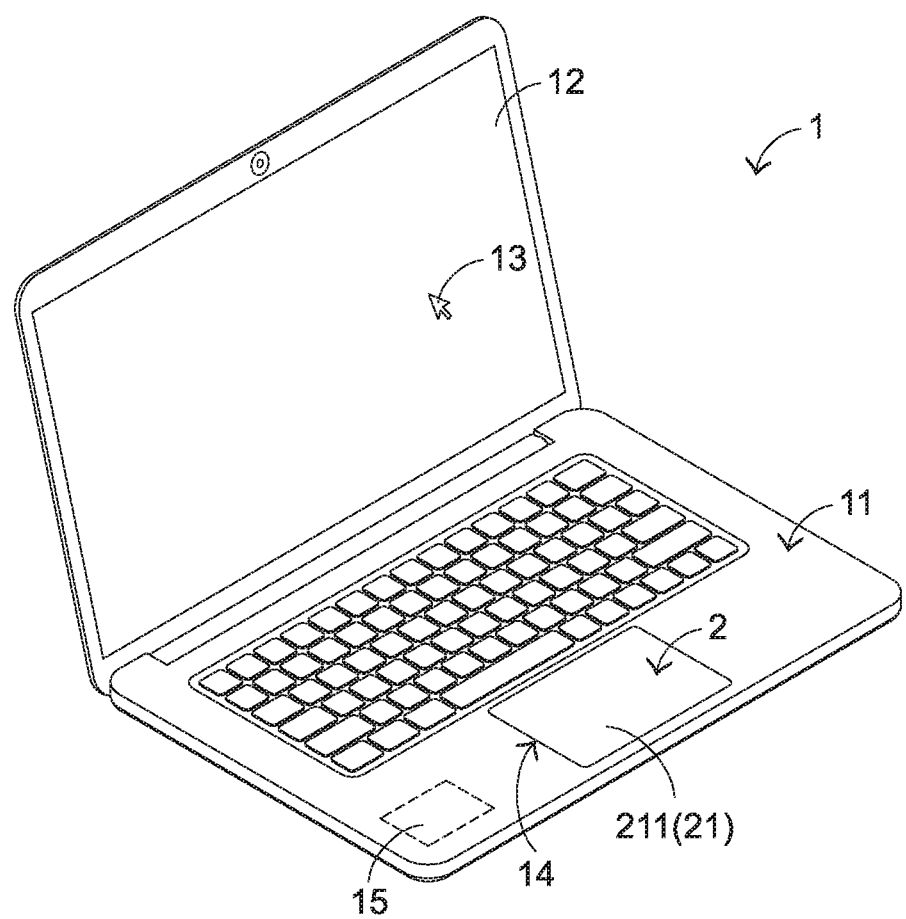
FIG. 1 is a schematic perspective view illustrating the outer appearance of a computing device with a touchpad module according to a first embodiment of the present invention.

FIG. 1 is a schematic perspective view illustrating the outer appearance of a computing device with a touchpad module according to a first embodiment of the present invention. An example of the computing device 1 includes but is not limited to a notebook computer. In an embodiment, the computing device 1 comprises a casing 11, a display screen 12, a processor 15 and a touchpad module 2. The processor 15 is disposed within the casing 11. The processor 15 is used for processing electronic signals of the computing device 1. Moreover, a fixing frame 14 is concavely formed in the casing 11. The touchpad module 2 is disposed within the fixing frame 14 and electrically connected with the processor 15. When the touchpad module 2 is disposed within the fixing frame 14, at least a portion of the touchpad module 2 is exposed outside so as to be touched by the user's finger. Consequently, the user can operate the touchpad module 2 to control the computing device 1. For example, in case that the user's finger is placed on the touchpad module 2 and slid on the touchpad module 2, a cursor 13 shown on the display screen 12 is correspondingly moved. Moreover, in case that the touchpad module 2 is pressed down by the user's finger, the computing device 1 executes a specified function.

The other structure of the touchpad module 2 will be described in more details as follows.

Figure 2:
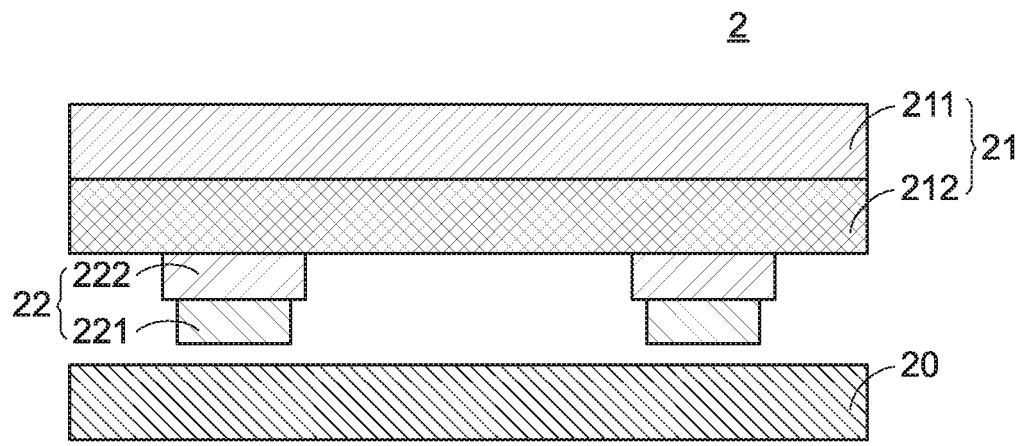
FIG. 2 is a schematic cross-sectional view illustrating the touchpad module as shown in FIG. 1.

FIG. 2 is a schematic cross-sectional view illustrating the touchpad module as shown in FIG. 1. As shown in FIG. 2, the touchpad module 2 comprises a base plate 20, a touch member 21 and at least one pressure sensing module 22.

The touch member 21 is located over the base plate 20. The touch member 21 comprises a touch plate 211 and a touch sensitive circuit board 212. The at least one pressure sensing module 22 is arranged between the base plate 20 and the touch member 21. Each pressure sensing module 22 comprises a pressure sensor 221 and a miniature supporting plate 222. The pressure sensor 221 is installed on the miniature supporting plate 222. In addition, the pressure sensor 221 is electrically connected with the touch sensitive circuit board 212 of the touch member 21 through the corresponding miniature supporting plate 222. While the touch member 21 is pressed in response to an external pressing force, the pressing force exerted on the touch member 21 is sensed by the pressure sensing module 22. Consequently, the pressure sensing module 22 generates a pressure sensing signal.

Please refer to FIG. 2 again. In this embodiment, the at least one pressure sensing module 22 is installed on the touch sensitive circuit board 212 of the touch member 21. In addition, the miniature supporting plate 222 of the pressure sensing module 22 is arranged between the corresponding pressure sensor 221 of the pressure sensing module 22 and the touch sensitive circuit board 212 of the touch member 21. While the touch member 21 is pressed in response to the external pressing force, the touch member 21 is subjected to deformation. Consequently, the touch member 21 has a deformation amount. According to the deformation amount of the touch member 21, the pressing force exerted on the touch member 21 is sensed by the pressure sensor 221. Consequently, the pressure sensor 221 generates the pressure sensing signal.

For example, as shown in FIG. 1, the touch member 21 is supported on the fixing frame 14 of the computing device 1 through an edge part of the touch plate 211. While the touch member 21 is pressed in response to the external pressing force, the touch member 21 is bent downwardly by using the junction between the edge part of the touch plate 211 and the fixing frame 14 as a fulcrum. Consequently, the touch member 21 has a downward deformation amount. According to the downward deformation amount of the touch member 21, the pressing force exerted on the touch member 21 is sensed by the pressure sensing module 22. Consequently, the pressure sensing module 22 generates the pressure sensing signal.

In the above embodiment, the touch member 21 is supported on the fixing frame 14 of the computing device 1 through the edge part of the touch plate 211. Consequently, the touch member 21 can be subjected to the downward deformation. It is noted that numerous modifications and alterations may be made while retaining the teachings of the invention. As long as the touch member 21 can be subjected to the deformation in response to the pressing force, the structural design of the touchpad module 2 is not restricted.

In an embodiment, the miniature supporting plate 222 of the pressure sensing module 22 is electrically connected with the touch sensitive circuit board 212 of the touch member 21 through an electrical connector (not shown). For example, the electrical connector is a flexible flat cable (FFC) connector. Alternatively, a flexible flat cable is welded on the miniature supporting plate 222 through a hot bar process to implement the function of the electrical connector. It is noted that the example of the electrical connector is not restricted.

Preferably but not exclusively, the touch plate 211 is made of glass or any other appropriate material. The material of the touch plate 211 may be varied according to the practical requirements. Moreover, the touch sensitive circuit board 212 and the touch plate 211 are combined together through a pressure sensitive adhesive (PSA) or any other appropriate material. Preferably, the base plate 20 is made of metallic material or any other appropriate material.

In this embodiment, the at least one pressure sensing module 22 includes two pressure sensing modules 22. It is noted that the number of the at least one pressure sensing module 22 is not restricted. For example, according to the practical requirements, the at least one pressure sensing module 22 includes more than two pressure sensing modules 22.

Figure 3:
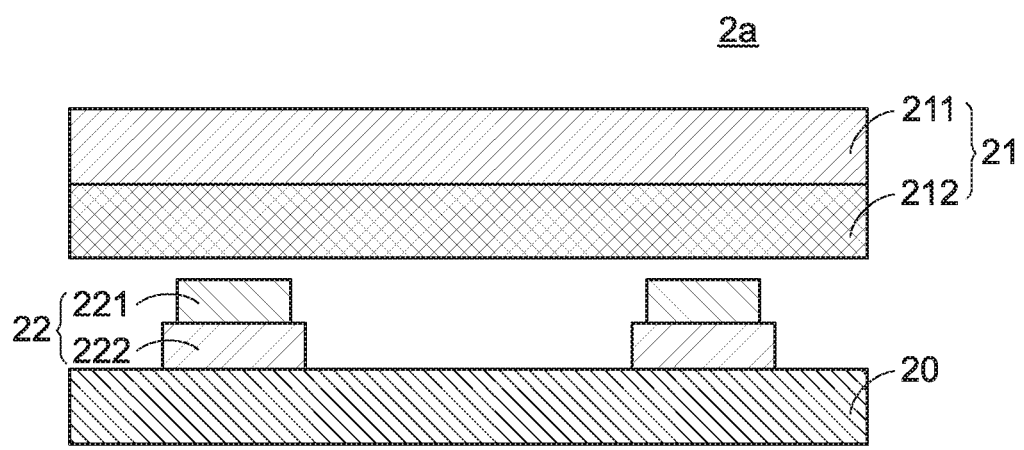
FIG. 3 is a schematic cross-sectional view illustrating a touchpad module according to a second embodiment of the present invention.

FIG. 3 is a schematic cross-sectional view illustrating a touchpad module according to a second embodiment of the present invention. Except for the position of the pressure sensing module 22, the other components of the touchpad module 2a of this embodiment are similar to those of the touchpad module 2 as shown in FIG. 2. In this embodiment, the at least one pressure sensing module 22 of the touchpad module 2a is installed on the base plate 20.

As shown in FIG. 3, the at least one pressure sensing module 22 is installed on the base plate 20. In addition, the miniature supporting plate 222 of the pressure sensing module 22 is arranged between the pressure sensor 221 of the pressure sensing module 22 and the base plate 20. While the touch member 21 is pressed in response to the external pressing force, the base plate 20 is driven by the touch member 21, and thus the base plate 20 is subjected to deformation. According to the deformation amount of the base plate 20, the pressing force exerted on the touch member 21 is sensed by the pressure sensor 221. Consequently, the pressure sensing module 22 generates the pressure sensing signal.

Please also refer to FIG. 1. In this embodiment, the touchpad module 2a is supported on the fixing frame 14 of the computing device 1 through an edge part of the base plate 20. In addition, plural supporting elements (not shown) are arranged between the touch member 21 and the base plate 20. While the touch member 21 is pressed in response to an external pressing force, the touch member 21 is moved in a direction toward the base plate 20, and these supporting structures are driven to push against the base plate 20. Consequently, the base plate 20 has a downward deformation amount. According to the downward deformation amount of the base plate 20, the pressing force exerted on the touch member 21 is sensed by the pressure sensing module 22. Consequently, the pressure sensing module 22 generates the pressure sensing signal.

In the above embodiment, the touchpad module 2a is supported on the fixing frame 14 of the computing device 1 through the edge part of the base plate 20. Consequently, the touch member 21 can be subjected to the downward deformation. Consequently, the base plate 20 can be subjected to the downward deformation. It is noted that numerous modifications and alterations may be made while retaining the teachings of the invention. As long as the base plate 20 can be correspondingly subjected to the deformation in response to the pressing force exerted on the touch member 21, the structural design of the touchpad module 2a is not restricted.

Figure 4:
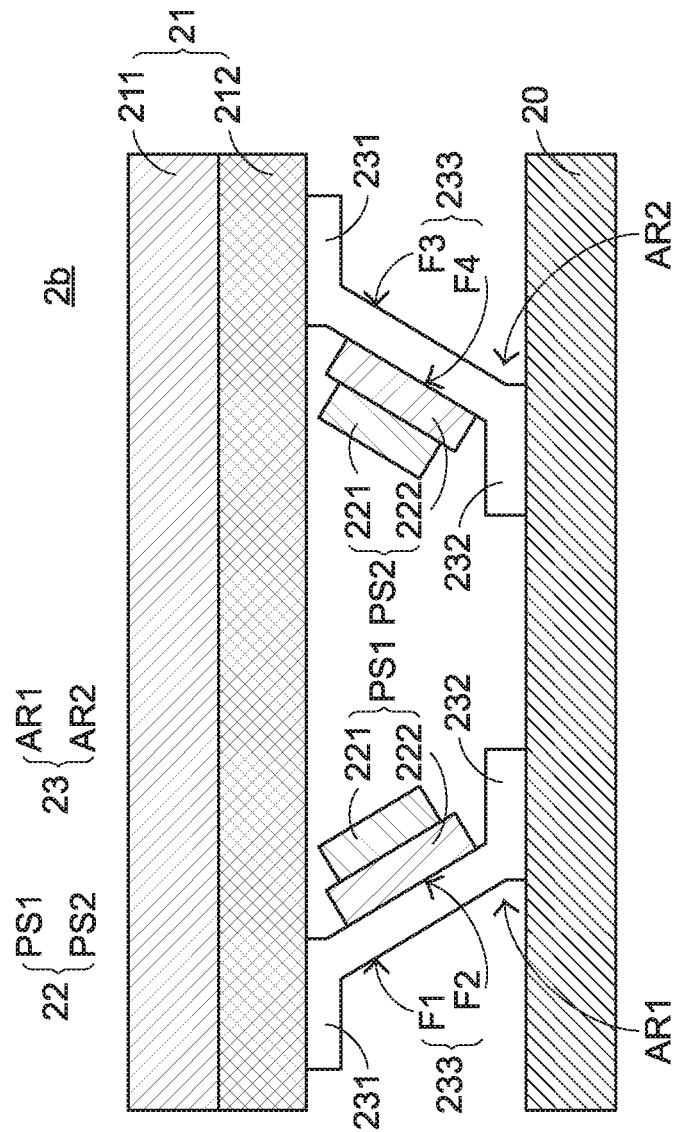
FIG. 4 is a schematic cross-sectional view illustrating a touchpad module according to a third embodiment of the present invention.

FIG. 4 is a schematic cross-sectional view illustrating a touchpad module according to a third embodiment of the present invention. In comparison with the touchpad module 2 of FIG. 2, the touchpad module 2b of this embodiment further comprises at least one cantilever structure 23. The at least one pressure sensing module 22 is installed on the at least one cantilever structure 23. The other components of the touchpad module 2b are similar to those of the touchpad module 2, and not redundantly described herein.

As shown in FIG. 4, the at least one cantilever structure 23 is arranged between the touch member 21 and the base plate 20. In addition, the miniature supporting plate 222 of the pressure sensing module 22 is arranged between the corresponding pressure sensor 221 and the cantilever structure 23. While the touch member 21 is pressed in response to an external pressing force, the cantilever structure 23 is compressed by the touch member 21. Consequently, the cantilever structure 23 is subjected to deformation, and the cantilever structure 23 has a deformation amount. According to the deformation amount of the cantilever structure 23, the pressing force exerted on the cantilever structure 23 is sensed by the pressure sensor 221. Consequently, the pressure sensor 221 generates a pressure sensing signal.

Please refer to FIG. 4 again. In an embodiment, the cantilever structure 23 comprises a first connection part 231, a second connection part 232 and an elastic body 233. The elastic body 233 of the cantilever structure 23 is connected between the first connection part 231 and the second connection part 232. The first connection part 231 is connected with the touch member 21. The second connection part 232 is connected with the base plate 20. In this embodiment, the pressure sensing module 22 is installed on the elastic body 223 of the cantilever structure 23.

In the embodiment of FIG. 4, the at least one cantilever structure 23 includes plural cantilever structures. The plural cantilever structures 23 comprise a first cantilever structure AR1 and a second cantilever structure AR2. The elastic body 233 of the first cantilever structure AR1 and the elastic body 233 of the second cantilever structure AR2 are inclined in the directions away from each other. The elastic body 233 of the first cantilever structure AR1 comprises a first surface F1 and a second surface F2, which are opposed to each other. The elastic body 233 of the second cantilever structure AR2 comprises a third surface F3 and a fourth surface F4, which are opposed to each other. In addition, the second surface F2 of the first cantilever structure AR1 and the fourth surface F4 of the second cantilever structure AR2 face each other.

In the embodiment of FIG. 4, the at least one pressure sensing module 22 includes plural pressure sensing modules 22. The plural pressure sensing modules 22 comprise a first pressure sensing module PS1 and a second pressure sensing module PS2. In this embodiment, the first pressure sensing module PS1 is installed on the second surface F2 of the first cantilever structure AR1, and the second pressure sensing module PS2 is installed on the fourth surface F4 of the second cantilever structure AR2.

In the above embodiment, the plural cantilever structures 23 comprise the first cantilever structure AR1 and the second cantilever structure AR2 corresponding to the first pressure sensing module PS1 and the second pressure sensing module PS2, respectively. It is noted that the number of the at least one cantilever structure 23 and the number of the at least one pressure sensing module 22 are not restricted. The number of the at least one cantilever structure 23 and the number of the at least one pressure sensing module 22 may be increased or decreased according to the practical requirements.

Figure 5:
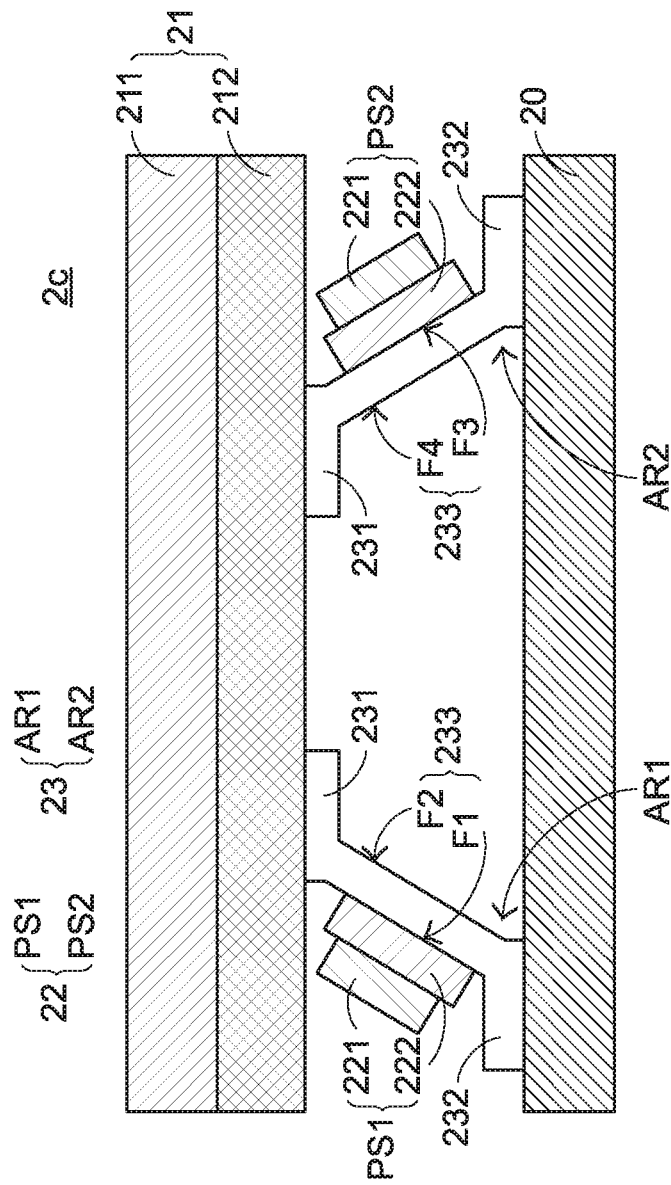
FIG. 5 is a schematic cross-sectional view illustrating a touchpad module according to a fourth embodiment of the present invention.

FIG. 5 is a schematic cross-sectional view illustrating a touchpad module according to a fourth embodiment of the present invention. In comparison with the touchpad module 2b of FIG. 4, the elastic body 233 of the first cantilever structure AR1 and the elastic body 233 of the second cantilever structure AR2 in the touchpad module 2b of this embodiment are inclined in the directions toward each other. In addition, the first pressure sensing module PS1 is installed on the first surface F1 of the first cantilever structure AR1, and the second pressure sensing module PS2 is installed on the third surface F3 of the second cantilever structure AR2. The other components of the touchpad module 2b are similar to those of the touchpad module 2c, and not redundantly described herein.

From the above descriptions, the present invention provides the touchpad module. In the touchpad module, the pressure sensor is directly installed on the miniature supporting plate, and the pressure sensor and the miniature supporting plate are collaboratively formed as the pressure sensing module. Since it is not necessary to install the pressure sensor on the flexible printed circuit, the assembling process of the present invention is easier than the conventional technology. Consequently, the structural design of the touchpad module of the present invention is simplified. Furthermore, the pressure sensing module of the present invention can be applied to the processes of manufacturing the touchpad modules with various sizes. As long as the pressure sensing module is installed on the corresponding position (e.g., the touch sensitive circuit board of the touch member, the base plate or the cantilever structure), the pressure sensing module can be applied to any appropriate touchpad module. The structural design of the touchpad module is simple. In addition, the touchpad module can be assembled easily. Consequently, the overall fabricating process is simplified, and the fabricating cost is largely decreased.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of the computing device, the touchpad module comprising:
a base plate;
a touch member located over the base plate, wherein the touch member comprises a touch plate and a touch sensitive circuit board;
at least one pressure sensing module arranged between the base plate and the touch member, wherein each of the at least one pressure sensing module comprises a pressure sensor and a miniature supporting plate, wherein the pressure sensor is installed on the miniature supporting plate, wherein while the touch member is pressed in response to an external pressing force, the pressing force exerted on the touch member is sensed by the at least one pressure sensing module, and the at least one pressure sensing module generates a pressure sensing signal; and
at least one cantilever structure, wherein the at least one cantilever structure is arranged between the touch member and the base plate, and the at least one pressure sensing module is installed on the at least one cantilever structure, wherein while the touch member is pressed in response to the pressing force, the at least one cantilever structure is compressed by the touch member, so that the at least one cantilever structure is subjected to deformation and the at least one cantilever structure has a deformation amount, wherein when the pressing force exerted on the touch member is sensed by the pressure sensing module according to the deformation amount, the at least one pressure sensor generates the pressure sensing signal.

2. The touchpad module according to claim 1, wherein each of the at least one cantilever structure comprises a first connection part, a second connection part and an elastic body, wherein the elastic body is connected between the first connection part and the second connection part, the first connection part is connected with the touch member, the second connection part is connected with the base plate, and the at least one pressure sensing module is installed on the elastic body.

3. The touchpad module according to claim 2, wherein the at least one cantilever structure includes plural cantilever structures, and the plural cantilever structures comprise a first cantilever structure and a second cantilever structure, wherein the elastic body of the first cantilever structure comprises a first surface and a second surface, and the elastic body of the second cantilever structure comprises a third surface and a fourth surface, wherein the first surface and the second surface are opposed to each other, the third surface and the fourth surface are opposed to each other, and the second surface and the fourth surface face each other.

4. The touchpad module according to claim 3, wherein the at least one pressure sensing module includes plural pressure sensing modules, and the plural pressure sensing modules comprise a first pressure sensing module and a second pressure sensing module, wherein the first pressure sensing module is installed on the first surface of the elastic body of the first cantilever structure, and the second pressure sensing module is installed on the third surface of the elastic body of the second cantilever structure.

5. The touchpad module according to claim 3, wherein the at least one pressure sensing module includes plural pressure sensing modules, and the plural pressure sensing modules comprise a first pressure sensing module and a second pressure sensing module, wherein the first pressure sensing module is installed on the second surface of the elastic body of the first cantilever structure, and the second pressure sensing module is installed on the fourth surface of the elastic body of the second cantilever structure.

* * * * *